United States Patent
Ohata

(10) Patent No.: US 10,715,691 B2
(45) Date of Patent: Jul. 14, 2020

(54) IMAGE FORMING APPARATUS INCLUDING AN ILLUMINATOR TO ILLUMINATE A WORK TARGET LOCATED IN A SPACE BETWEEN AN IMAGE READER AND AN IMAGE FORMER

(71) Applicant: KONICA MINOLTA, INC., Chiyoda-ku, Tokyo (JP)

(72) Inventor: Tsutomu Ohata, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/029,042

(22) Filed: Jul. 6, 2018

(65) Prior Publication Data

US 2019/0052759 A1 Feb. 14, 2019

(30) Foreign Application Priority Data

Aug. 8, 2017 (JP) .................................. 2017-152840

(51) Int. Cl.
*H04N 1/00* (2006.01)

(52) U.S. Cl.
CPC ....... *H04N 1/0049* (2013.01); *H04N 1/00631* (2013.01); *H04N 1/00697* (2013.01); *H04N 1/00771* (2013.01); *H04N 1/00639* (2013.01)

(58) Field of Classification Search
None
See application file for complete search history.

(56) References Cited

U.S. PATENT DOCUMENTS

| | | | | |
|---|---|---|---|---|
| 6,658,218 | B2* | 12/2003 | Krolczyk | B65H 43/00 399/16 |
| 7,505,714 | B2* | 3/2009 | Asanuma | H04N 1/00519 347/104 |
| 8,488,137 | B2 | 7/2013 | Matsumoto et al. | |
| 2004/0213590 | A1* | 10/2004 | Schroath | G03G 15/70 399/21 |
| 2007/0014580 | A1* | 1/2007 | Woo | G03G 21/1638 399/21 |
| 2009/0153916 | A1* | 6/2009 | Borsuk | H04N 1/0057 358/474 |
| 2009/0213436 | A1* | 8/2009 | Takuwa | H04N 1/00384 358/442 |

(Continued)

FOREIGN PATENT DOCUMENTS

JP 2011053298 A 3/2011

*Primary Examiner* — Miya J Williams
(74) *Attorney, Agent, or Firm* — Holtz, Holtz & Volek PC

(57) ABSTRACT

An image forming apparatus of an internal ejection type in which a sheet ejection space is provided between an image reader and an image former, the image forming apparatus includes: an illuminator provided on a wall surface partitioning the sheet ejection space; a detector that detects a position of a work target enabled to move in pulling-out and storing directions within the sheet ejection space; and a controller that performs on/off control of the illuminator depending on a detection position of the detector, wherein in a case where it is detected that the work target is in a work position for performing human work, the controller performs on/off control of the illuminator to illuminate a work target portion that faces an interior of the sheet ejection space of the work target and is subjected to the human work.

19 Claims, 13 Drawing Sheets

(56) References Cited

U.S. PATENT DOCUMENTS

| | | | |
|---|---|---|---|
| 2011/0051167 A1* | 3/2011 | Matsumoto | G03G 15/6552 358/1.13 |
| 2012/0230747 A1* | 9/2012 | Cole | B41J 11/006 400/582 |
| 2015/0198922 A1* | 7/2015 | Ohta | G03G 15/6552 399/405 |
| 2017/0088387 A1* | 3/2017 | Arikawa | B65H 31/24 |
| 2017/0131679 A1* | 5/2017 | Koyanagi | G03G 15/70 |
| 2017/0185878 A1* | 6/2017 | Matsuo | G06K 15/4025 |

* cited by examiner

IMAGE FORMING APPARATUS INCLUDING AN ILLUMINATOR TO ILLUMINATE A WORK TARGET LOCATED IN A SPACE BETWEEN AN IMAGE READER AND AN IMAGE FORMER

The entire disclosure of Japanese patent Application No. 2017-152840, filed on Aug. 8, 2017, is incorporated herein by reference in its entirety.

BACKGROUND

Technological Field

The present invention relates to an image forming apparatus, and more particularly to a technique for improving maintainability of a post-processor mounted within a sheet ejection space.

Description of the Related Art

In recent years, in a widely used digital multi-function peripheral (MFP), in general, a sheet ejection space is provided between an electrophotographic image former and an image reader arranged above the image former, and a copied or printed sheet is ejected into the sheet ejection space. This makes it possible to reduce an installation area of the multi-function peripheral as compared with a case where an ejection tray is provided on the side of the multi-function peripheral. Likewise, a post-processor that performs stapling, punching, sorting, and the like may be also mounted within the sheet ejection space in order to reduce the installation area of the multi-function peripheral.

Such a sheet ejection space is vertically sandwiched between the image former and the image reader, and also surrounded by support walls that support the image reader, so that external light hardly enters.

In addition, in recent years, because of its excellent operability and visibility, there has been a growing demand for mounting an operation panel using a large screen touch panel liquid crystal display (LCD) without impairing designability of the MFP. The size of the LCD panel of the MFP is conventionally about 7 inches to 10 inches; however, if the large screen LCD panel such as of 13 inches is arranged in front of the conventional image reader, the panel becomes an obstacle during setting of a document. In addition, although it is conceivable to separately provide a working table for arrangement, the installation space is increased or the designability is impaired.

For this reason, if the operation panel is arranged at a position lower than the conventional position on the front of the MFP, both the installation space saving and the designability can be achieved. However, in such an arrangement, since the operation panel covers a part of the front of the sheet ejection space and the external light is blocked, it becomes darker in the sheet ejection space.

Therefore, there is a problem that, when the post-processor is mounted within the sheet ejection space, the external light hardly enters also during maintenance such as replacement of a staple cartridge, so that visibility is remarkably low and the workability becomes very poor.

For such a problem, for example, as shown in FIG. 13, a post-processor has been devised mounting a light source 1301 and a light shielding member 1302 (see, for example, JP 2011-053298 A). This makes it possible to illuminate a staple cartridge 1303 within the sheet ejection space and to prevent the illumination light from entering eyes of a maintenance worker, so that workability during the maintenance can be improved.

However, a requirement for downsizing of the multi-function peripheral continues to increase, and in order to meet the requirement, the sheet ejection space has been narrowed, and it is also inevitable to downsize the post-processor mounted within the sheet ejection space. Mounting the light source 1301 and the light shielding member 1302 on a post-processor 13 is contrary to the requirement for downsizing, which is not desirable. In addition, even if the light source 1301 and the light shielding member 1302 can be mounted, since the mounting position is restricted, it is not always possible to mount the light source 1301 or the light shielding member 1302 to a position preferable for improving the workability, and there is a possibility that a necessary luminance cannot be obtained.

When the light source 1301 is made to protrude from the post-processor 13 in order to illuminate the staple cartridge 1303, it may prevent the sheet receiving port of the post-processor 13 from being arranged close to the sheet ejection port of the MFP main body, or it may lead to an increase in size of the post-processor 13 itself, which is not preferable. On the other hand, in a case where the light source 1301 is made not to protrude from the post-processor 13, it is difficult to emit the illumination light toward the staple cartridge, or a sufficient amount of illumination light cannot be obtained, which makes it difficult to improve workability during the maintenance.

Such a problem applies not only to the post-processor 13 but also to all objects to be subjected to some work in the state of being mounted within the sheet ejection space.

SUMMARY

The present invention has been made in view of the problems as described above, and an object thereof is to provide an image forming apparatus capable of achieving sufficient workability even when a work target such as a post-processor is downsized.

To achieve the abovementioned object, according to an aspect of the present invention, an image forming apparatus of an internal ejection type in which a sheet ejection space is provided between an image reader and an image former, reflecting one aspect of the present invention comprises: an illuminator provided on a wall surface partitioning the sheet ejection space; a detector that detects a position of a work target enabled to move in pulling-out and storing directions within the sheet ejection space; and a controller that performs on/off control of the illuminator depending on a detection position of the detector, wherein in a case where it is detected that the work target is in a work position for performing human work, the controller performs on/off control of the illuminator to illuminate a work target portion that faces an interior of the sheet ejection space of the work target and is subjected to the human work.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 3A is a side view and FIG. 3B is a plan view;

FIG. 8C shows a state of the sub-sensors at time of on;

DETAILED DESCRIPTION OF EMBODIMENTS

Hereinafter, one or more embodiments of an image forming apparatus according to the present invention will be described with reference to the drawings. However, the scope of the invention is not limited to the disclosed embodiments.

[1] Configuration of Image Forming Apparatus

First, a configuration will be described of the image forming apparatus according to a present embodiment.

Figure 1:
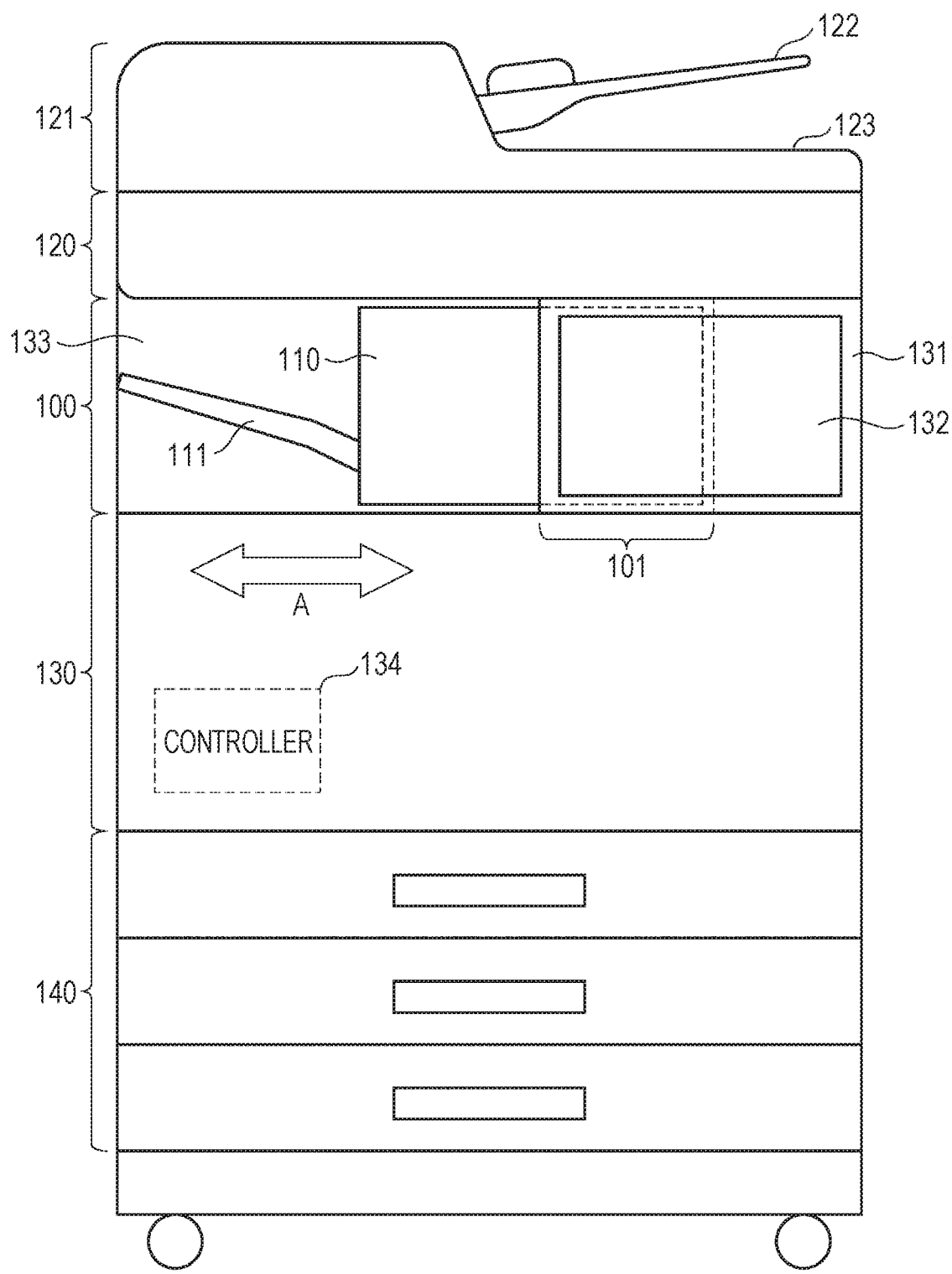
FIG. 1 is a diagram showing a main configuration of an image forming apparatus according to an embodiment of the present invention.

As shown in FIG. 1, an image forming apparatus 1 is a so-called internal ejection type digital multi-function peripheral, and includes a sheet ejection space 100 in an internal portion between an image reader 120 and an image former 130. A post-processor 110 is accommodated inside the sheet ejection space 100. An operation panel 131 is arranged so as to cover a part 101 of the sheet ejection space 100 on the right side as viewed from the front side of the image forming apparatus 1 (hereinafter simply referred to as the "front side").

The sheet ejection space 100 includes a sheet ejection port on the right side as viewed from the front side, a wall surface 133 on the back side, and further the operation panel 131 on the front side, so that external light hardly enters.

The operation panel 131 includes a touch panel 132, and presents information to a user of the image forming apparatus 1 and accepts an instruction input from the user. When accepting an instruction input from the user on the operation panel 131 and executing copy processing, for example, in a sheet-through system, the image forming apparatus 1 feeds documents one by one from a document bundle placed on a document tray 122 of an automatic document feeder (ADF) 121 and conveys the documents to a reading position of the image reader 120. The image reader 120 reads an image from a document at the reading position and generates digital image data, and the data is stored in a controller 134 of the image former 130. The document having passed through the reading position is ejected onto an ejection tray 123.

The image former 130 forms a toner image on the basis of the digital image data stored in the controller 134, transfers the toner image onto a recording sheet supplied from a sheet feeding cassette 140, heat-fixes the toner image, and ejects the recording sheet. The post-processor 110 receives the recording sheet ejected by the image former 130, performs post-processing such as stapling, punching, sorting, and the like, and then ejects the recording sheet onto an ejection tray 111.

A guide rail (not shown) is provided at a portion facing the sheet ejection space 100, of the top of the image former 130, and the post-processor 110 can slide between a stored position and a pulled-out position along the guide rail.

Figure 2A:
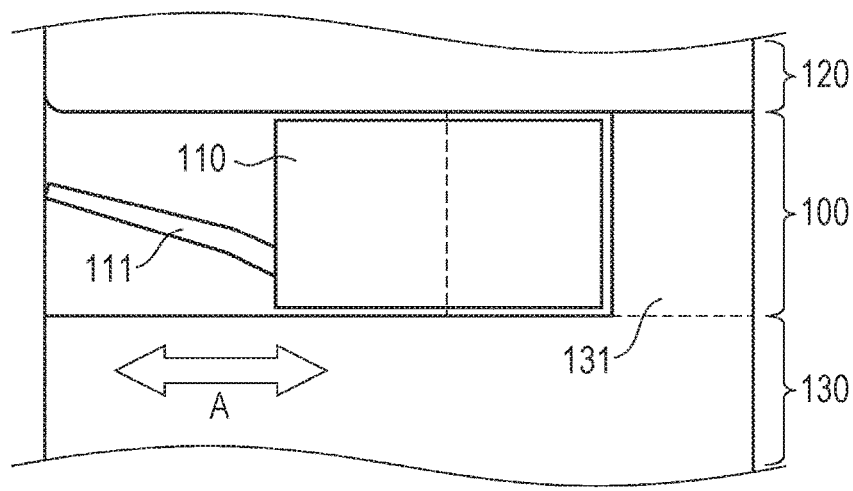
FIG. 2A shows a stored position of a post-processor in a sheet ejection space.

In the stored position, as shown in FIG. 2A, the post-processor 110 is close to the sheet ejection port of the image former 130, and can receive the sheet ejected by the image former 130. On the other hand, since a part of the post-processor 110 is covered and hidden behind the operation panel 131 indicated by a broken line, maintenance work cannot be performed in a state where the post-processor 110 is at the stored position.

Figure 2B:
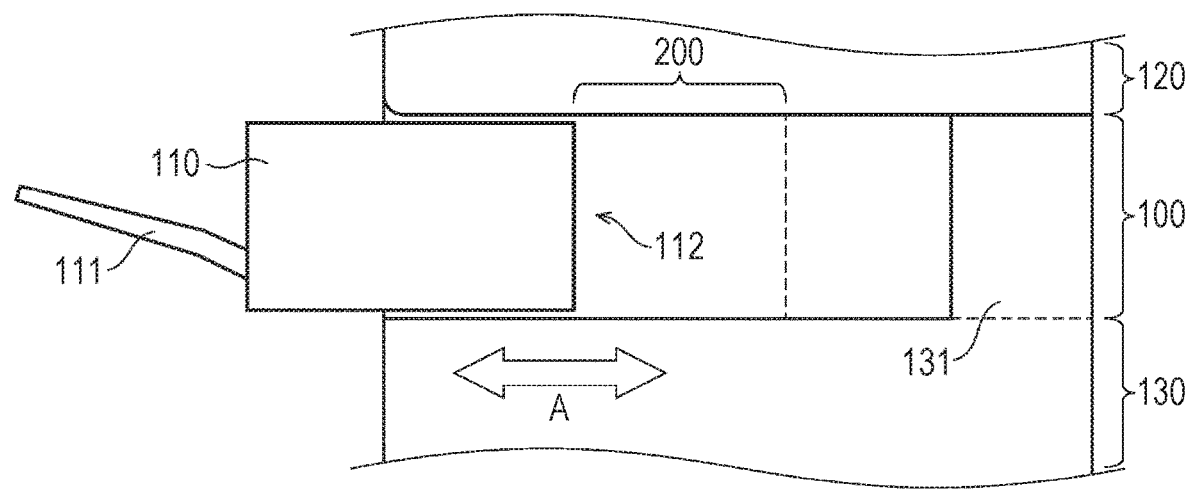
FIG. 2B shows a pulled-out position.

When the post-processor 110 is slid from the stored position to the pulled-out position along the guide rail, as shown in FIG. 2B, since the sheet receiving side end 112 of the post-processor 110 is positioned on the left side of the operation panel 131 as viewed from the front side, a maintenance worker can access the sheet receiving side end 112 of the post-processor 110 from a gap 200 between the post-processor 110 and the operation panel 131.

However, since the depth of the sheet ejection space 100 is deep and the post-processor 110 is on the left side of the gap 200 as viewed from the front side, when the maintenance worker attempts to access the sheet receiving side end 112 of the post-processor 110 so as to cover the front side of the image forming apparatus 1, almost no external light can enter the sheet receiving side end 112, so that visibility of the sheet receiving side end 112 is remarkably degraded and workability is lowered.

Figure 3A:
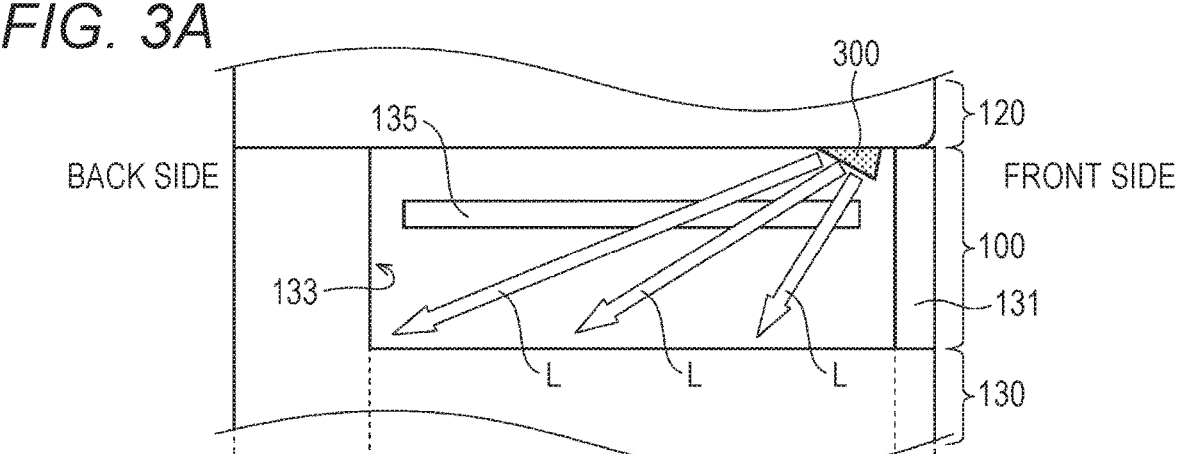
FIGS. 3A and 3B are views each showing an arrangement of an illuminator in the sheet ejection space.
Figure 3B:
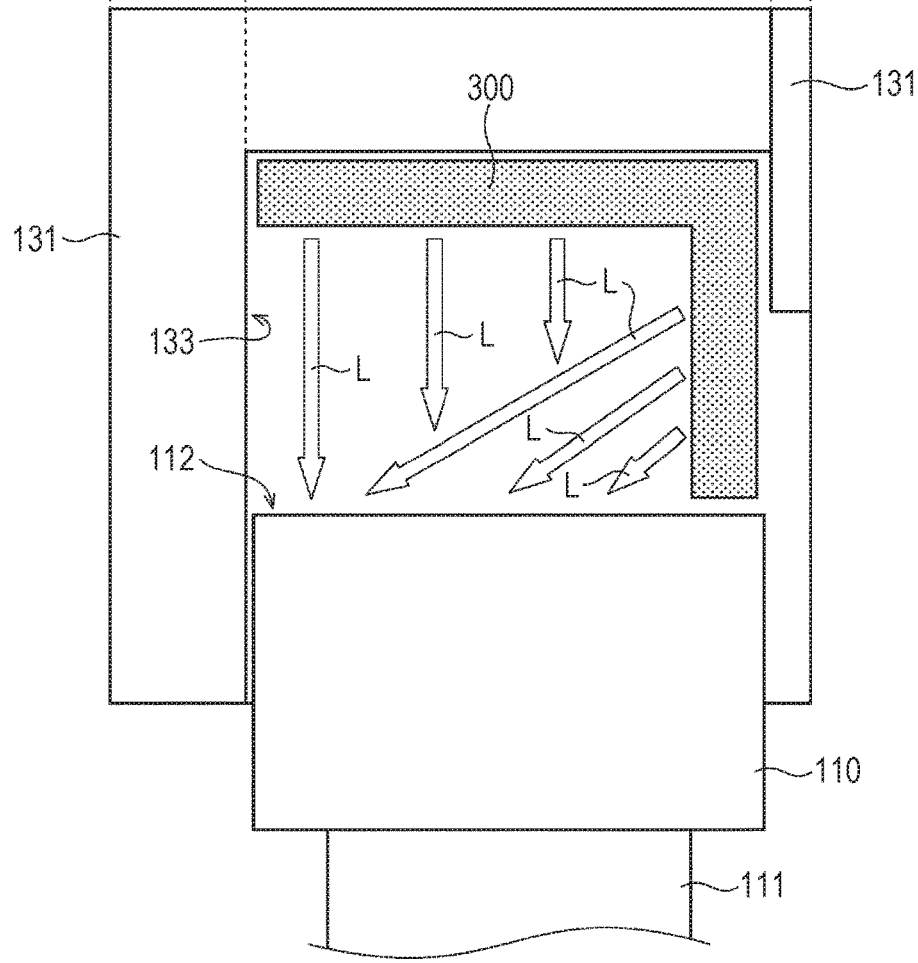

For this reason, as shown in FIGS. 3A and 3B, an illuminator 300 is installed on the bottom of the image reader 120. The illuminator 300 is light emitting diodes (LEDs) provided on the front side from the sheet ejection port 135 of the image former 130 up to the sheet receiving side end 112 of the post-processor 110 of when the post-processor 110 is at the pulled-out position, and above the sheet ejection port 135 from the back side of the operation panel 131 up to the wall surface 133.

The illuminator 300 provided on the front side emits illumination light from the front side toward the back side and the illuminator 300 provided above the sheet ejection port 135 emits illumination light from the sheet ejection port 135 side toward the sheet receiving side end 112. Therefore, since the illumination light of the illuminator 300 is not emitted toward the worker during the maintenance work, the worker can perform maintenance without being prevented by dazzling.

[2] Configuration of Controller 134

Next, the configuration will be described of the controller 134.

Figure 4:
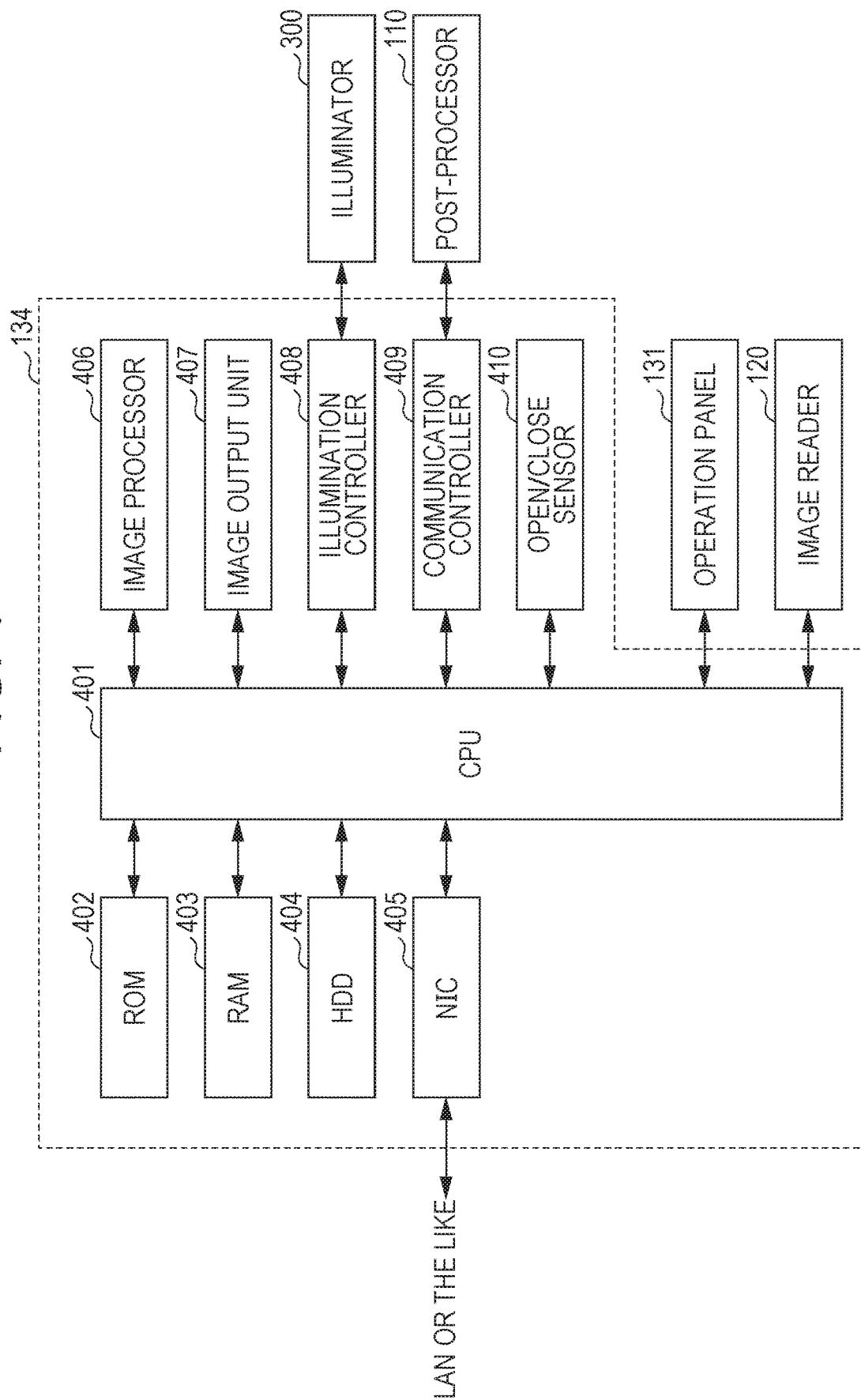
FIG. 4 is a block diagram showing a main configuration of a controller.

The controller 134 includes a central processing unit (CPU) 401, read only memory (ROM) 402, random access memory (RAM) 403, and the like, as shown in FIG. 4. When power is supplied to the image forming apparatus 1, the CPU 401 reads a boot program from the ROM 402 and executes the boot program. The CPU 401 further executes an operating system (OS) and a control program read from a hard disk drive (HDD) 404 with the RAM 403 as a work memory area. In addition, the CPU 401 accesses a communication network such as a local area network (LAN) by using a network interface card (NIC) 405 and executes communication processing such as accepting a print job.

An image processor 406 corrects or processes image data read by the image reader 120 or image data received from another apparatus by using the NIC 405. An image output unit 407 generates image data to be used for image formation in the image former 130 from image data specified by the print job.

An illumination controller 408 controls on/off and an amount of light of the illuminator 300 in accordance with an instruction signal from the CPU 401. As described later, the illuminator 300 includes a plurality of LEDs, and the illumination controller 408 can individually turn on and off the individual LEDs and control the amount of light. The turning on and off includes blinking of the LEDs, in which turning on and off are repeated each having a predetermined period.

A communication controller 409 performs serial communication processing with the post-processor 110 in order to instruct the post-processor 110 to execute a detail of the post-processing specified by the print job, and to manage timing for the post-processor 110 to operate in conjunction with the image former 130. In addition, the CPU 401 acquires, via the communication controller 409, state information such as occurrence of a conveying failure (jam) in a sheet passing section in the post-processor 110, and, in the case of having a stapling function, whether or not a staple in a staple cartridge has run out, or whether or not staple clogging has occurred.

The CPU 401 acquires the state information via the communication controller 409, also about whether or not clogging of punch waste (paper waste generated when the sheet is punched) has occurred generated when the post-processor 110 performs punching processing. The post-processor 110 includes a punch waste container for storing the punch waste, and the punch waste stored in the punch waste container is discarded during the maintenance work. In addition, replacement of the staple cartridge and elimination of staple clogging are also the maintenance work.

An open/close sensor 410 detects whether or not the post-processor 110 is at the pulled-out position. As described later, the CPU 401 refers to a detection signal of the open/close sensor 410 and does not turn on the illuminator 300 if the post-processor 110 is not at the pulled-out position. Hereinafter, the fact that the post-processor 110 is at the pulled-out position is referred to as "cover open". In addition, an event that requires the maintenance work in association with a punching function is hereinafter referred to as "punch error", and an event that requires the maintenance work in association with the stapling function is hereinafter referred to as "staple error".

Besides, the CPU 401 reads image data from the HDD 404, generates image data to be displayed on the operation panel 131, and receives a user's instruction input signal from the operation panel 131, thereby performing information presentation to the user and instruction acceptance from the user. In addition, the CPU 401 controls the image reader 120 so that an image can be read from a document in accordance with an instruction from the user accepted via the operation panel 131. Instructions from the user include a reading setting for specifying document image quality, resolution, and the like, a document setting for specifying the type and direction of the document, and the like.

[3] Configuration of Post-Processor 110

Next, a configuration will be described of the post-processor 110.

Figure 5:
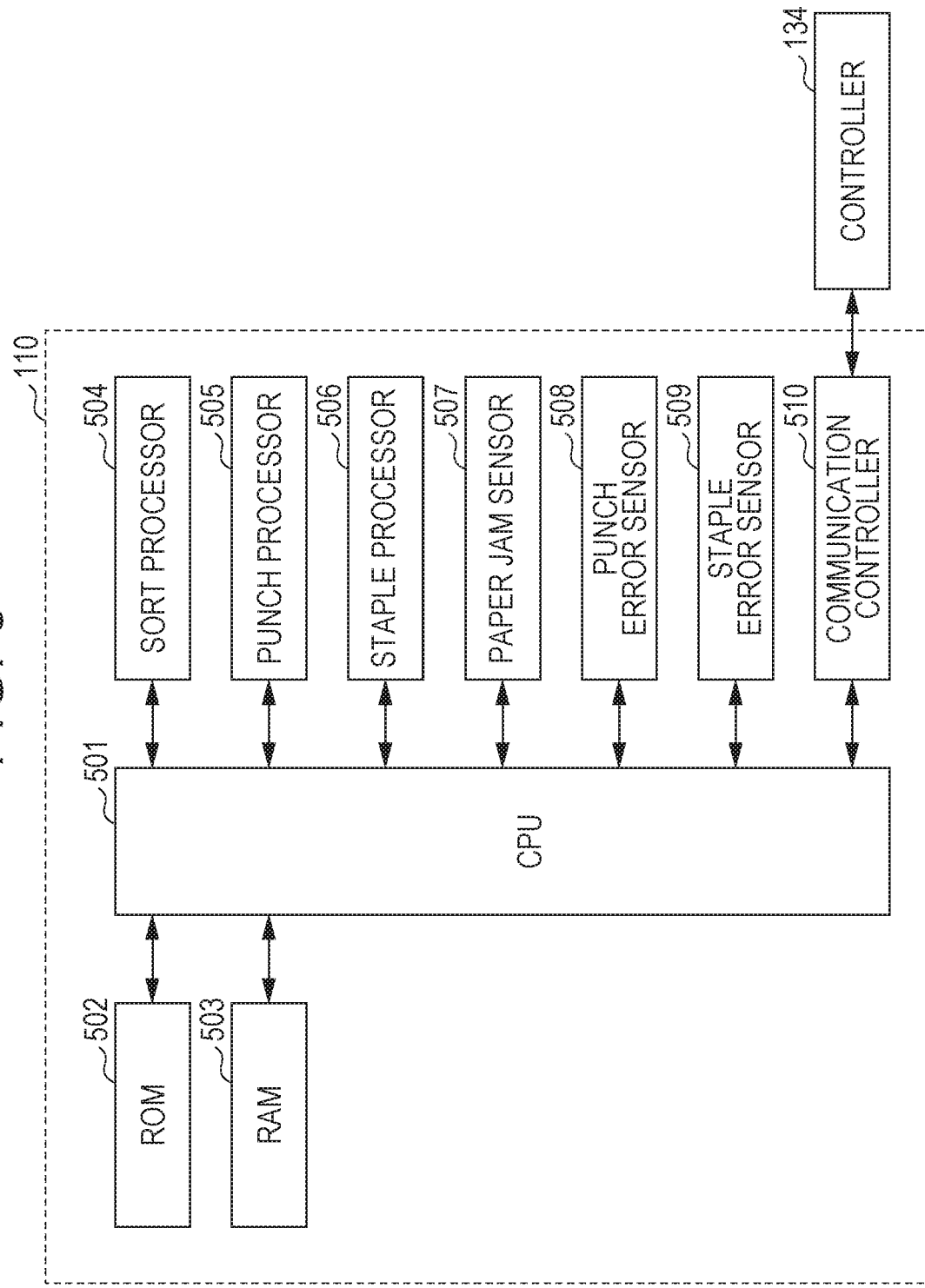
FIG. 5 is a diagram showing a main configuration of the post-processor.

The post-processor 110 includes a CPU 501, ROM 502, RAM 503, and the like, as shown in FIG. 5. When power is supplied to the image forming apparatus 1 and the post-processor 110 is energized, the CPU 501 reads the boot program from the ROM 502 and is activated, and executes a control program read from the ROM 502 with the RAM 503 as a work memory area.

Upon accepting specification of a post-processing detail and post-processing timing from the controller 134 via the communication controller 409, depending on the post-processing detail, the CPU 501 controls a sorting processor 504, a punching processor 505, and a stapling processor 506, to execute the post-processing. The sorting processor 504 executes sorting processing for sorting sheets, and the punching processor 505 punches a predetermined position of a sheet bundle. The stapling processor 506 binds a predetermined position of the sheet bundle with a staple.

In addition, during execution of the post-processing, the CPU 501 monitors occurrence of a paper jam by using a paper jam sensor 507, and monitors whether or not the punch waste is clogged in a punching blade by using a punch error sensor 508. Further, the CPU 501 monitors clogging of the staple and whether the staple cartridge is empty by using the staple error sensor.

When detecting occurrence of an error by using the paper jam sensor 507, the punch error sensor 508, and the staple error sensor 509, the CPU 501 stops the post-processing. In addition, in a case where an inquiry about the occurrence of an error is received from the controller 134 via the communication controller 409, the CPU 501 performs notification of a current state.

[4] Control of Illuminator 300

Next, control operation will be described of the illuminator 300 by the controller 134.

Figure 6:
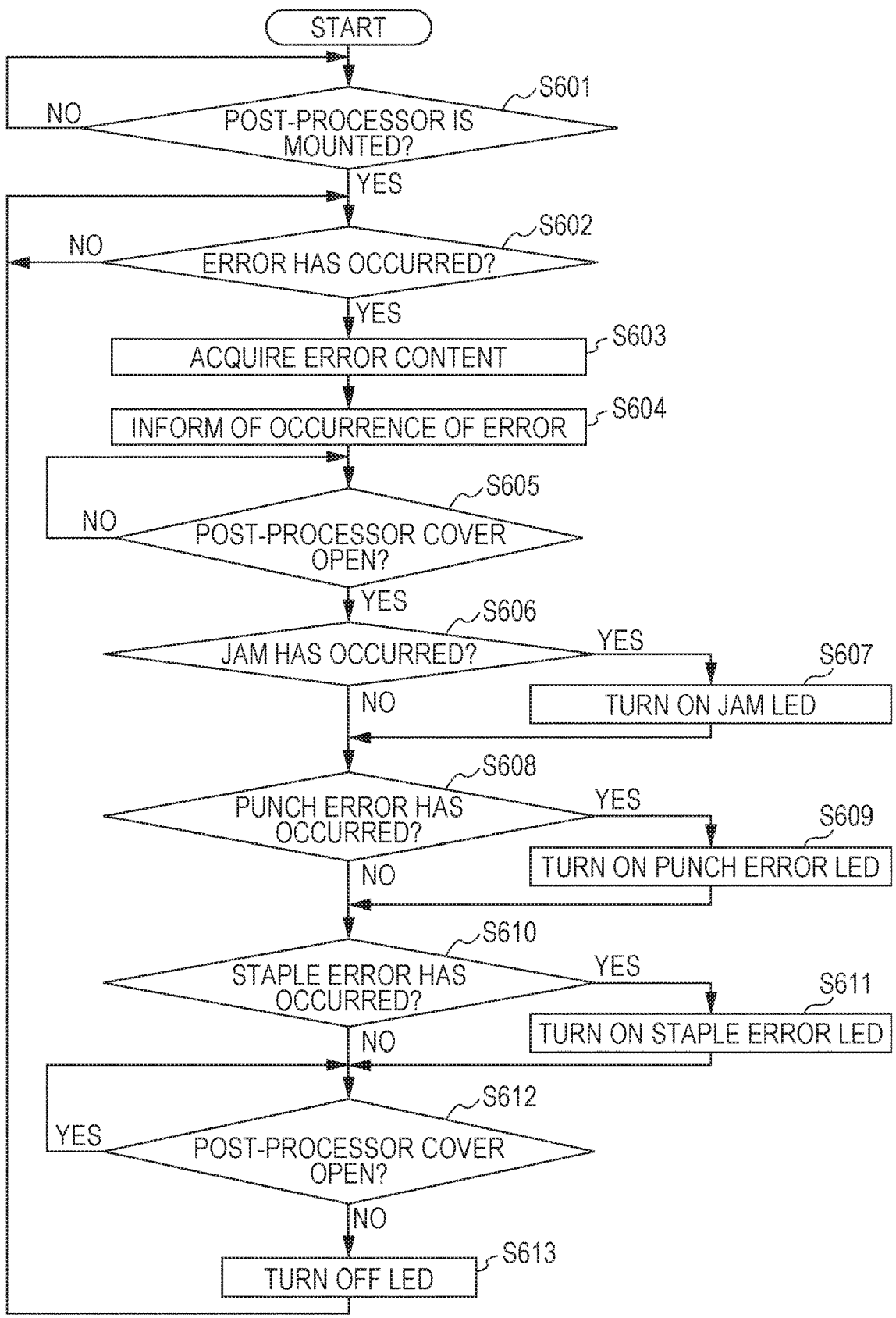
FIG. 6 is a flowchart showing control operation of the illuminator by the controller.

As shown in FIG. 6, the controller 134 confirms whether or not the post-processor 110 is mounted. Whether or not the post-processor 110 is mounted can be confirmed, for example, by accessing the post-processor 110 via the communication controller 409. In a case where the post-processor 110 is mounted on the image forming apparatus 1 (S601: YES), the controller 134 waits for an error occurrence notification from the post-processor 110.

When receiving the error occurrence notification from the post-processor 110 (S602: YES), the controller 134 acquires a detail of the error having occurred from the post-processor 110 (S603), and notifies the user of the image forming apparatus 1 that the error has occurred in the post-processor 110 with the operation panel 131 (S604), and monitors the detection signal of the open/close sensor 410.

When the cover open of the post-processor 110 is confirmed with the detection signal of the open/close sensor 410 (S605: YES), it is determined that the maintenance work of the post-processor 110 can be started, so that the controller 134, in a case where occurrence of a jam is detected in the processor 110 (S606: YES), turns on jam LEDs (S607).

Figure 7A:
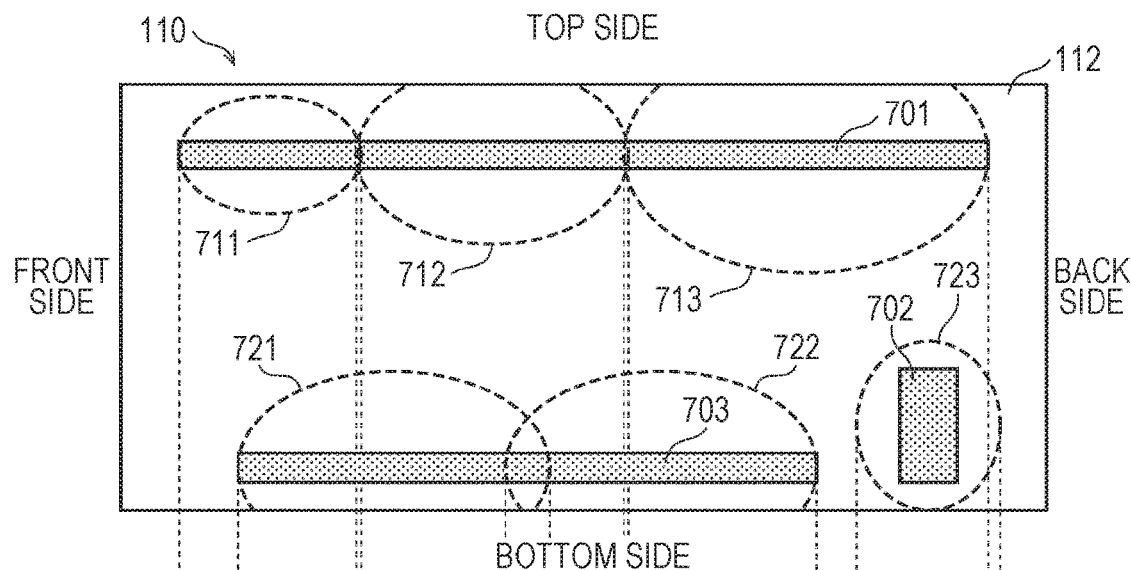
FIG. 7A is a side view showing a configuration of the sheet receiving side end of the post-processor.
Figure 7B:
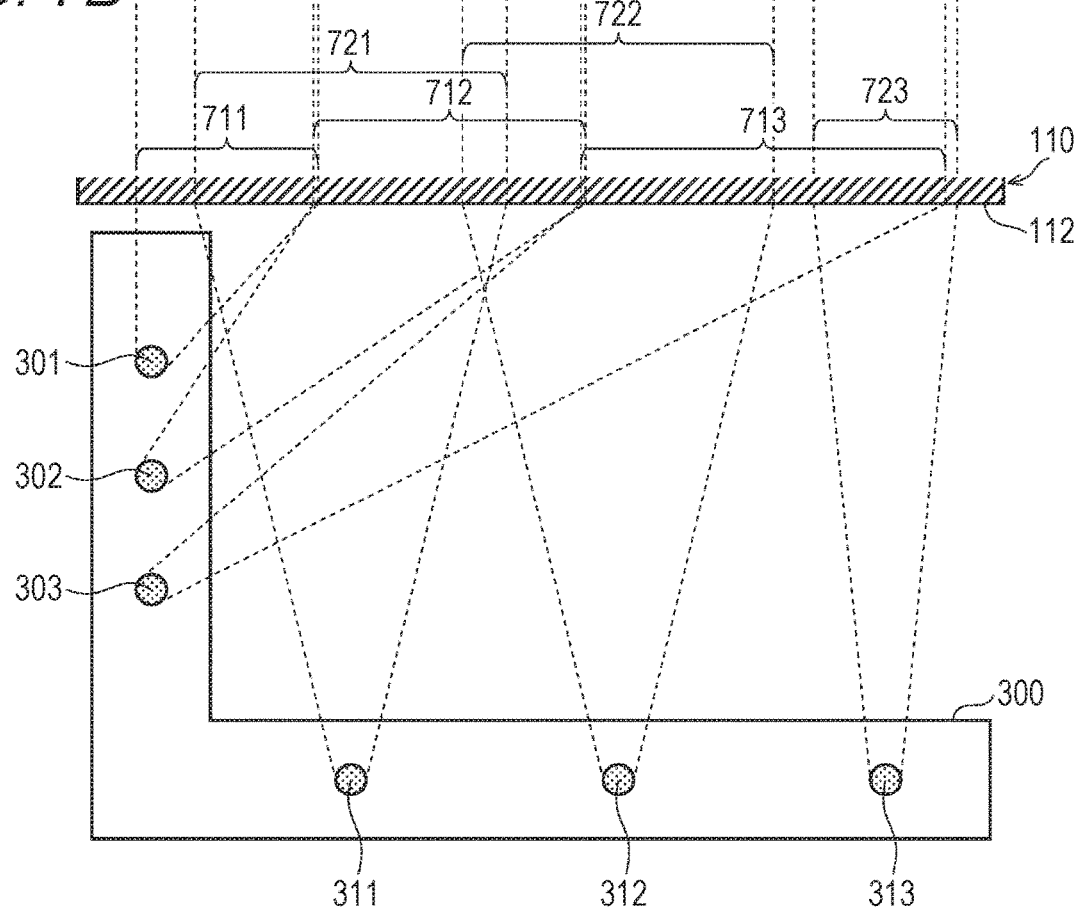
FIG. 7B is a plan view showing a main configuration of the illuminator.

As shown in FIG. 7B, the illuminator 300 includes six LEDs, and jam LEDs 301, 302, and 303 are arranged on the front side of the image forming apparatus 1. The jam LED 301 illuminates a range 711 including the front side of a sheet receiving port 701 provided at the sheet receiving side end 112 of the post-processor 110 (FIG. 7A). Likewise, the jam LEDs 302 and 303 respectively illuminate ranges 712 and 713 including the center and back side of the sheet receiving port 701. In this way, the entire sheet receiving port 701 is illuminated by the jam LEDs 301, 302, and 303.

In addition, in a case where occurrence of a punch error is detected (S608: YES), punch error LEDs are turned on (S609). As shown in FIG. 7B, punch error LEDs 311 and 312 are arranged above the sheet ejection port 135 and on the front side and the center of the image forming apparatus 1. As shown in FIG. 7A, a punch waste container 703 can be pulled out from the sheet receiving side end 112, the punch error LED 311 illuminates the front side portion of the punch waste container 703, and the punch error LED 312 illuminates a portion on the back side of the punch waste container 703. In this way, the entire punch waste container 703 is illuminated.

Further, in a case where occurrence of a staple error is detected (S610: YES), a staple error LED is turned on (S611). As shown in FIG. 7B, a staple error LED 313 is arranged above the sheet ejection port 135 and on the back side of the image forming apparatus 1. As shown in FIG. 7A, a staple cartridge 702 can be pulled out from the sheet receiving side end 112, and the staple error LED 313 illuminates the entire staple cartridge 702.

Thereafter, while the post-processor 110 is in a cover open state (S612: YES), the on state of the LED is maintained. On the other hand, when the post-processor 110 is not in the cover open state (S612: NO), it is determined that the maintenance work is completed and the post-processor 110 has been returned from the pulled-out position to the stored position. Therefore, since it is not necessary to continue to turn on the LEDs, all the LEDs are turned off (S613), and the processing proceeds to step S602, and the above processing is repeated.

[5] Modifications

In the above, the present invention has been described on the basis of the embodiment; however, it goes without saying that the present invention is not limited to the above-described embodiment, and the following modifications can be implemented.

(5-1) In the above embodiment, as an example, the case has been described where the LED is applied to the illuminator 300; however, needless to say, the present invention is not limited thereto, and an incandescent lamp may be used instead of the LED. In addition, although other illuminator may be used, it is desirable that the illuminator is a compact illuminator in consideration of the requirement for downsizing of the image forming apparatus 1 and the post-processor 110. In addition, in order to selectively illuminate a portion depending on the detail of the maintenance work, an illuminator is preferable that can emit illumination light with high directivity.

(5-2) In the above embodiment, as an example, the case has been described where the illuminator 300 is arranged on the front side of the image forming apparatus 1 and above the sheet ejection port 135; however, needless to say, the present invention is not limited thereto, and instead of this, the illuminator may be arranged at another position. A position at which the illuminator is arranged is not limited to the above, as long as the illuminator can illuminate a maintenance work target position in the sheet ejection space 100.

(5-3) In the above embodiment, as an example, the case has been described where the open/close sensor 410 for detecting the cover open of the post-processor 110 detects whether or not the post-processor 110 is at the pulled-out position. On the other hand, an open/close sensor of a front door, or the like of the image forming apparatus 1 usually detects whether it is completely closed or it is opened even a little. In a case where this is applied to the maintenance work of the post-processor 110, if the post-processor 110 is displaced from the stored position even in a little, the illuminator 300 is turned on.

Then, there is a possibility that the worker inappropriately tries to perform the maintenance work in a state where the post-processor 110 is not completely opened and it is difficult to perform the maintenance work. For this reason, according to the above embodiment, the illuminator 300 is turned on after the post-processor 110 is completely opened, and the maintenance work target position is not illuminated in a state where the post-processor 110 is not completely opened, so that it is possible to suppress inappropriate maintenance work.

Figure 8A:
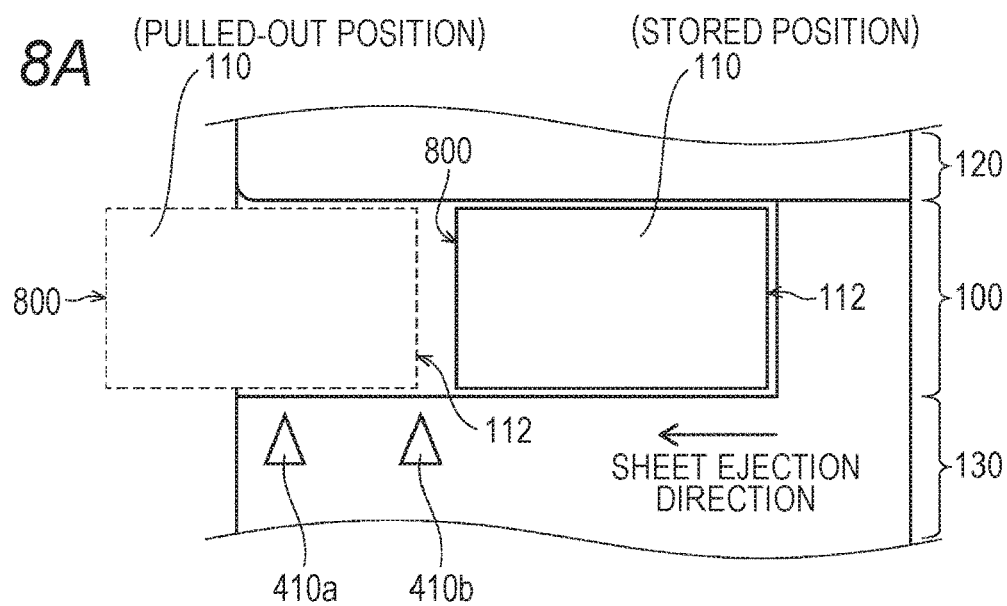
FIG. 8A shows an arrangement of sub-sensors constituting an open/close sensor.

The open/close sensor 410 may include, for example, sub-sensors 410a and 410b, as shown in FIG. 8A. The sub-sensor 410a is arranged on the downstream side in the sheet ejection direction of the sheet receiving side end 112 of when the post-processor 110 is at the pulled-out position, and the sub-sensor 410b is arranged on the immediately upstream side of the sheet receiving side end 112 of when the post-processor 110 is at the pulled-out position. Note that, in a case where the post-processor 110 is at the pulled-out position, a downstream side end 800 in a sheet conveying direction of the post-processor 110 protrudes to the outside of the sheet ejection space 100.

The sub-sensor 410a is turned off in a case where the post-processor 110 is at the stored position (solid line), and when the post-processor 110 is separated from the stored position (solid line) and the downstream side end 800 in the sheet ejection direction of the post-processor 110 reaches the sub-sensor 410a, the sub-sensor 410a is turned on and continues to be turned on until the post-processor 110 reaches the pulled-out position (broken line). In addition, even after the post-processor 110 reaches the pulled-out position (broken line), the sub-sensor 410a continues to be turned on.

On the other hand, the sub-sensor 410b is also turned off in a case where the post-processor 110 is at the stored position (solid line), and when the post-processor 110 is separated from the stored position (solid line) and the downstream side end 800 in the sheet ejection direction of the post-processor 110 reaches the sub-sensor 410b, the sub-sensor 410b is turned on, but thereafter is turned off again when the post-processor 110 reaches the pulled-out position (broken line).

That is, it can be detected whether or not the post-processor 110 is at the pulled-out position depending on whether or not the sub-sensor 410a is turned on and the sub-sensor 410b is turned off.

Figure 8B:
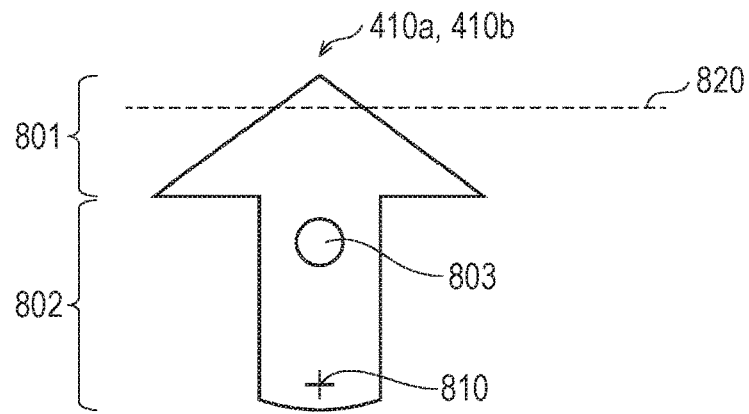
FIG. 8B shows a state of the sub-sensors at time of off.

The sub-sensors 410a and 410b each have a common configuration. As shown in FIGS. 8A and 8B, a detection part 801 and a light shielding part 802 are integrally formed together. Since the sub-sensors 410a and 410b are supported on a swing shaft 803 at a position closer to the detection part 801 than the center of gravity, at time of off when the post-processor 110 is not in contact with the detection part 801, the light shielding part 802 is suspended, and the detection part 801 is positioned above. In this state, the tip of the detection part 801 protrudes above a placement surface 820 (the bottom of the sheet ejection space 100) of the post-processor 110.

The sub-sensors 410a and 410b further include a light emitting unit and a light receiving unit (not shown), and it is detected whether the post-processor 110 is in contact with the detection part 801 depending on whether or not detection light emitted from the light emitting unit enters the light receiving unit.

In a case where the post-processor 110 is not at an arrangement position of the sub-sensors 410a and 410b in the sheet conveying direction, as shown in FIG. 8B, an optical path of the detection light from the light emitting unit toward the light receiving unit is blocked at a position 810, so that the detection light does not enter the light receiving unit, and the light receiving unit outputs a detection signal to that effect. That is, the sub-sensors 410a and 410b are turned off. As a result, the controller 134 determines that there is no post-processor 110 at a detection position by the sub-sensors 410a and 410b.

Figure 8C:
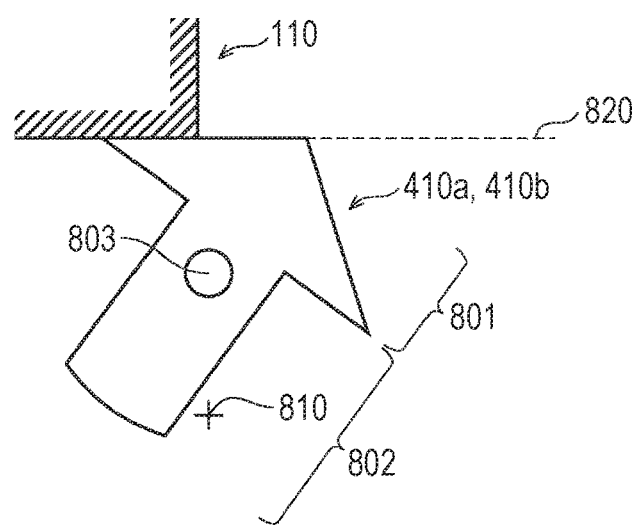

On the other hand, in a case where the post-processor 110 is at the arrangement position of the sub-sensors 410a and 410b in the sheet conveying direction, as shown in FIG. 8C, by contact of the post-processor 110, the sub-sensors 410a and 410b are swung so that the detection part 801 is not above the placement surface 820 of the post-processor 110. As a result, the light shielding part 802 is out of the position 810 through which the optical path of the detection light from the light emitting unit toward the light receiving unit passes, and does not block the detection light, so that the detection light enters the light receiving unit, and the light receiving unit outputs a detection signal to that effect.

That is, the sub-sensors 410a and 410b are turned on. As a result, the controller 134 determines that there is the post-processor 110 at the detection position by the sub-sensors 410a and 410b.

Note that, needless to say, the configuration of the open/close sensor 410 is not limited to the above, and even with another configuration, it is possible to obtain the effect of the present invention as long as it is possible to detect whether or not the post-processor 110 is at the pulled-out position.

(5-4) In the above embodiment, as an example, the case has been described where the illuminator 300 includes six LED lamps; however, needless to say, the present invention is not limited thereto, and instead of this, a number of lamps other than six may be used. For example, in a case where the entire sheet receiving side end 112 of the post-processor 110 can be illuminated by one lamp, the number of lamps may be one.

In a case where the number of lamps is one, it is also conceivable that it is impossible to obtain the amount of illumination light necessary for the maintenance work depending on the structure of the post-processor 110. In such a case, if a plurality of lamps is mounted, it is possible to obtain the amount of light necessary for the maintenance work.

Further, a case is also conceivable where the area to be illuminated or the amount of light is different between the JAM processing and replacement work of the staple cartridge. In such a case, as in the above embodiment, if the lamp for illuminating the necessary area is individually mounted, the necessary amount of light can be obtained for each irradiation area.

Figure 9:
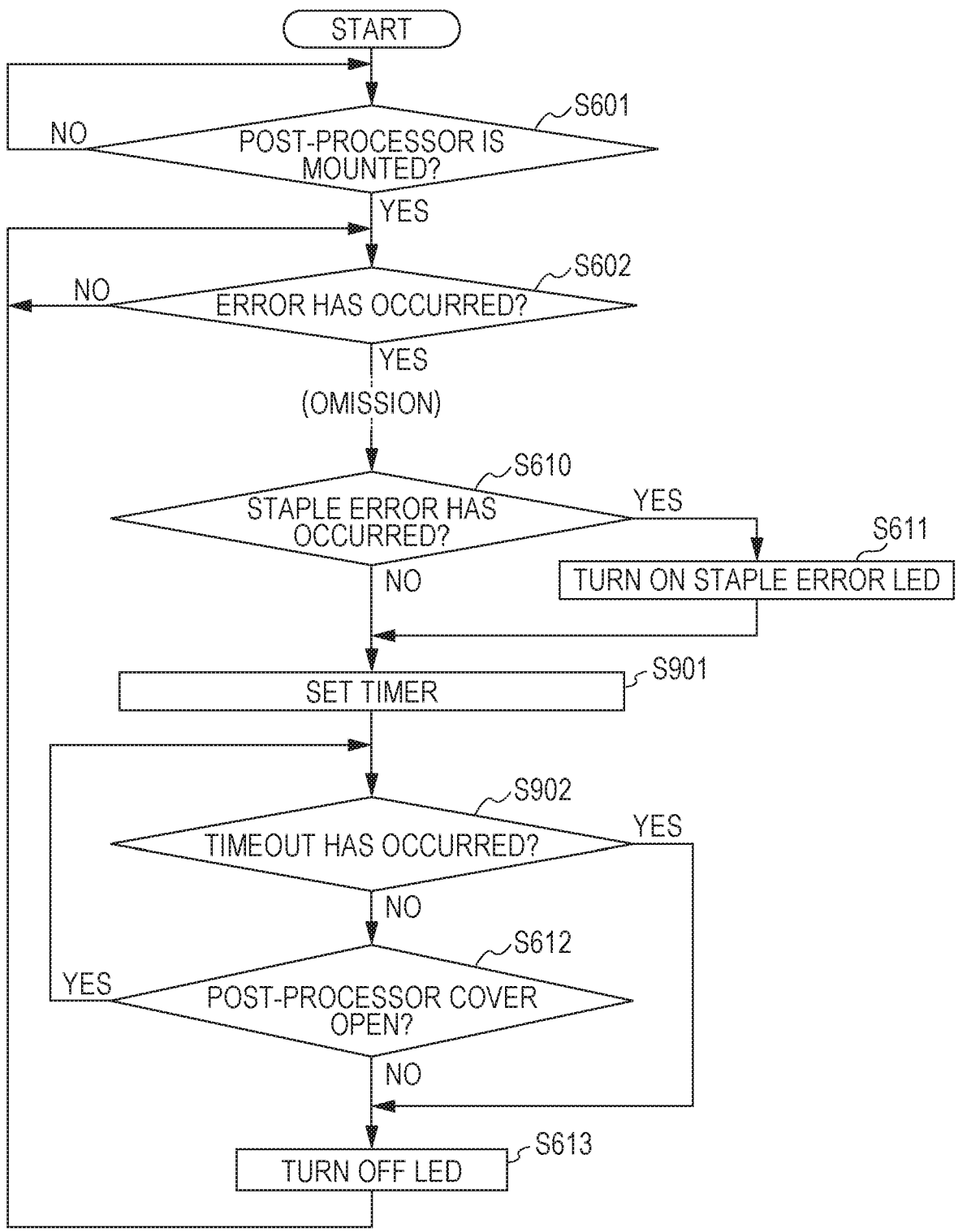
FIG. 9 is a flowchart showing timer processing of the controller according to a modification of the present invention.

(5-5) In the above embodiment, as an example, the case has been described where the LEDs are continuously turned on until the cover open of the post-processor is not detected (S612: NO); however, needless to say, the present invention is not limited thereto, and instead of this, the LEDs may be turned on as follows. For example, a timer is provided in the controller 134, and as shown in FIG. 9, after the LEDs are turned on, a predetermined time is set in the timer (S901), after that, even if the post-processor 110 stays at the pulled-out position (S610: NO), if timeout occurs (S 902: YES), the LED may be turned off (S613).

For example, there may be a case where the maintenance worker leaves the place due to some reason, such as confirming the maintenance procedure to the service center while leaving the post-processor 110 in the cover open state after a jam or the like has occurred in the post-processor 110. In such a case, unnecessary power consumption can be reduced by turning off the lamp after a lapse of a predetermined time. In addition, if the lamp is left to be turned on, there is a possibility that a person other than the maintenance worker unnecessarily touches the inside of the device to cause further trouble, but if the lamp is turned off after the lapse of the predetermined time, the occurrence of such a problem can be suppressed.

(5-6) Although not mentioned in the above embodiment, the plurality of LED lamps constituting the illuminator 300 may respectively have different light colors from each other. For example, the maintenance work of the post-processor includes jam processing, staple cartridge replacement, punch waste removal, sheet passing section cleaning, and the like, and the light color of the lamp may be made to be different corresponding to the maintenance detail, for example, blue for the jam processing, white for the staple cartridge exchange, and so on. In this way, the maintenance worker can easily understand the maintenance work to be performed with the light of the lamp.

Note that, two or more LEDs respectively having different light colors may be provided for each lamp, and the light color of the lamp may be controlled depending on which one of the two or more LEDs is turned on. Further, instead of the light color, or with the light color, the illuminance of the lamp may be made to be different. For example, since the jam processing is only removing the sheet, even low illuminance is sufficient, and since relatively fine work is necessary for the staple cartridge replacement and the sheet passing section cleaning, if the illuminance is increased, workability can be improved.

Figure 10:
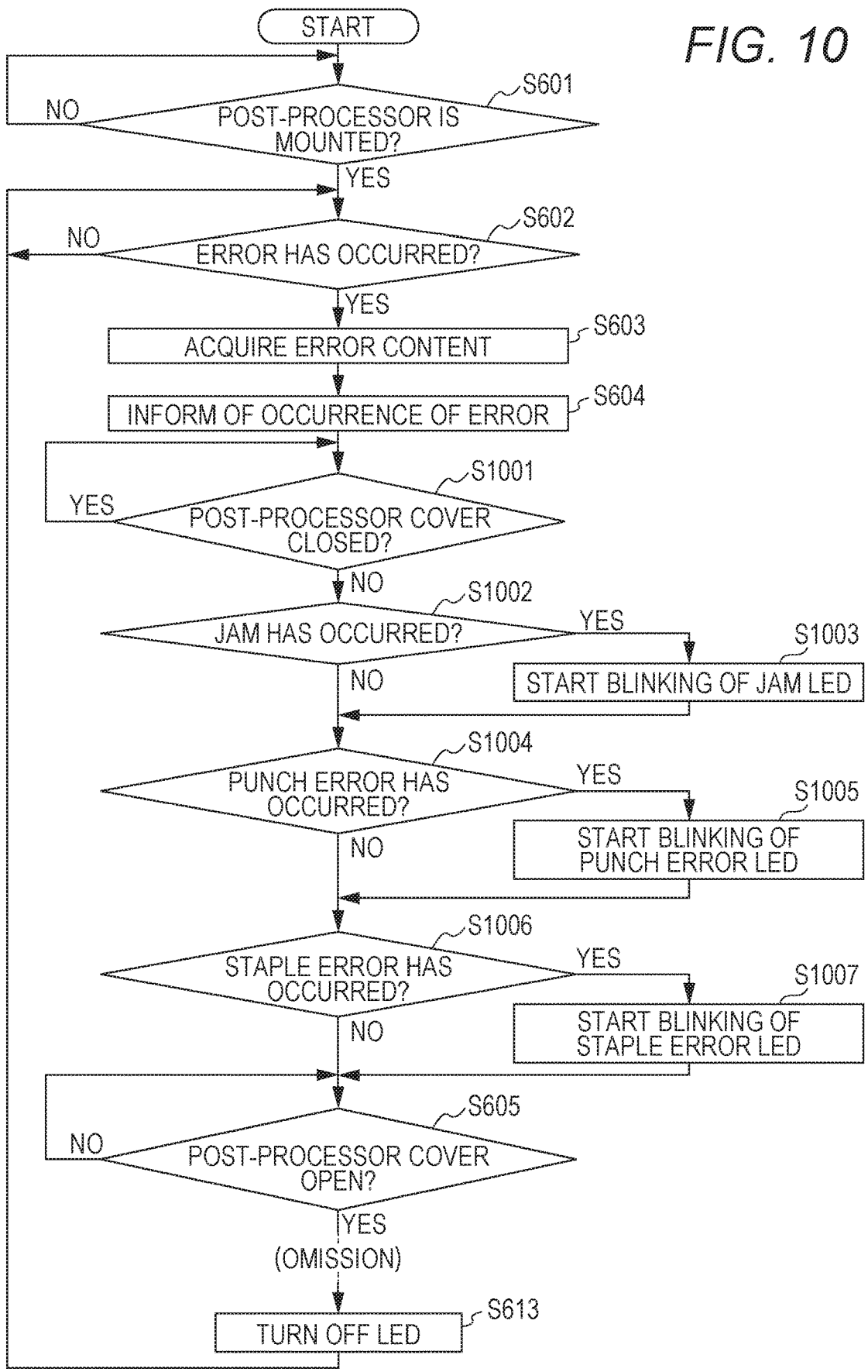
FIG. 10 is a flowchart showing blinking control of the controller according to a modification of the present invention.

In addition, in a case where the post-processor 110 is neither at the pulled-out position nor at the stored position, the lamp may be caused to blink. Specifically, a sensor is arranged for detecting "cover closed" in which the post-processor 110 is at the stored position, and as shown in FIG. 10, after an error occurrence notification is performed on the operation panel 131 (S604), when it is detected that it is not in a cover closed state (S1001: NO), if a jam has occurred (S1002: YES), blinking of the jam LEDs 301, 302, and 303 is started (S1003), if a punch error has occurred (S1004: YES), blinking of the punch error LEDs 311, 312 is started (S1005), and if a staple error has occurred (S1006: YES), blinking of the staple error LED 313 is started (S1007), and then the processing proceeds to step S602.

In this way, in a state where the cover is opened but not fully opened, that is, while the post-processor 110 is being moved from the stored position to the pulled-out position, the lamp is caused to blink, and after the post-processor 110 has reached the pulled-out position, the lamp is continuously turned on, whereby it is possible to urge the maintenance worker to wait for the post-processor 110 to reach the pulled-out position and then perform the maintenance work.

(5-7) In the above embodiment, as an example, the on/off control of the illuminator 300 has been described in the case where the post-processor 110 is mounted; however, needless to say, the present invention is not limited thereto, and in addition to this, the on/off control may be performed as follows.

Since the illuminator 300 is arranged on the main body side of the image forming apparatus 1, even in a case where the post-processor 110 is not mounted, the lamp can be turned on. In a state where the post-processor is not mounted, the sheet on which image formation has been completed is ejected to the sheet ejection space 100. As described above, since the sheet ejection space 100 is surrounded by the image reader 120, the image former 130, and the operation panel 131, in the upper and lower sides and the three directions in the plan view, the external light hardly enters and it is dark, and it is difficult for the user of the image forming apparatus 1 to notice that the sheet is ejected. For such a problem, if the illuminator 300 is turned on, visibility of the sheet ejected can be improved.

Figure 11A:
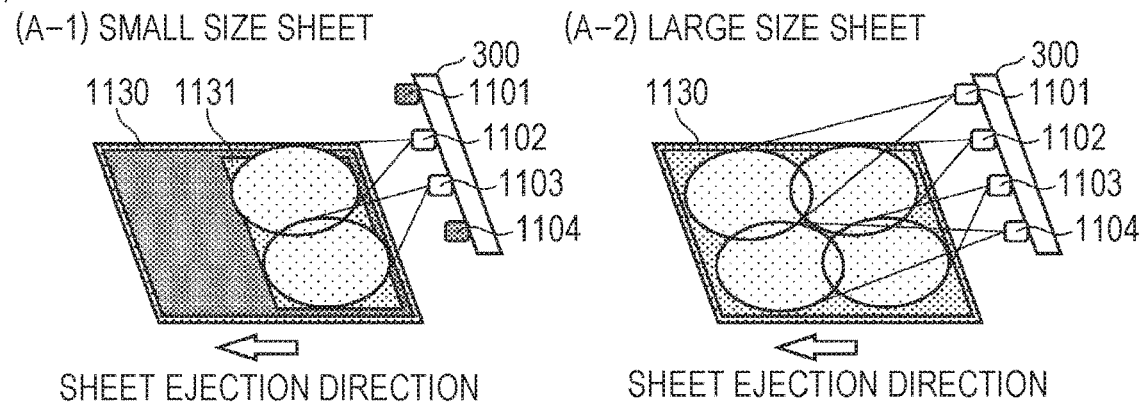
FIG. 11A shows a case where LEDs above a sheet ejection port are also used for illumination of a sheet ejected.

For example, as shown in FIG. 11A, four LEDs 1101, 1102, 1103, and 1104 may be provided by adding LEDs to the illuminator 300 above the sheet ejection port 135. In this case, if the sheet to be ejected is a small size sheet, as shown in FIG. 11A (A-1), the LEDs 1101 and 1104 are turned off while the LEDs 1102 and 1103 are turned on, whereby only a small size sheet ejection position 1131 can be illuminated.

In this way, it is possible not only to reduce power consumption by turning off the LEDs 1101 and 1104 but also to make the position of the small size sheet be easily recognized by the user. In addition, in a case where a large size sheet is ejected, as shown in FIG. 11A(A-2), all the four LEDs 1101, 1102, 1103, and 1104 are turned on. In this way, the entire large size sheet is illuminated.

Figure 12:
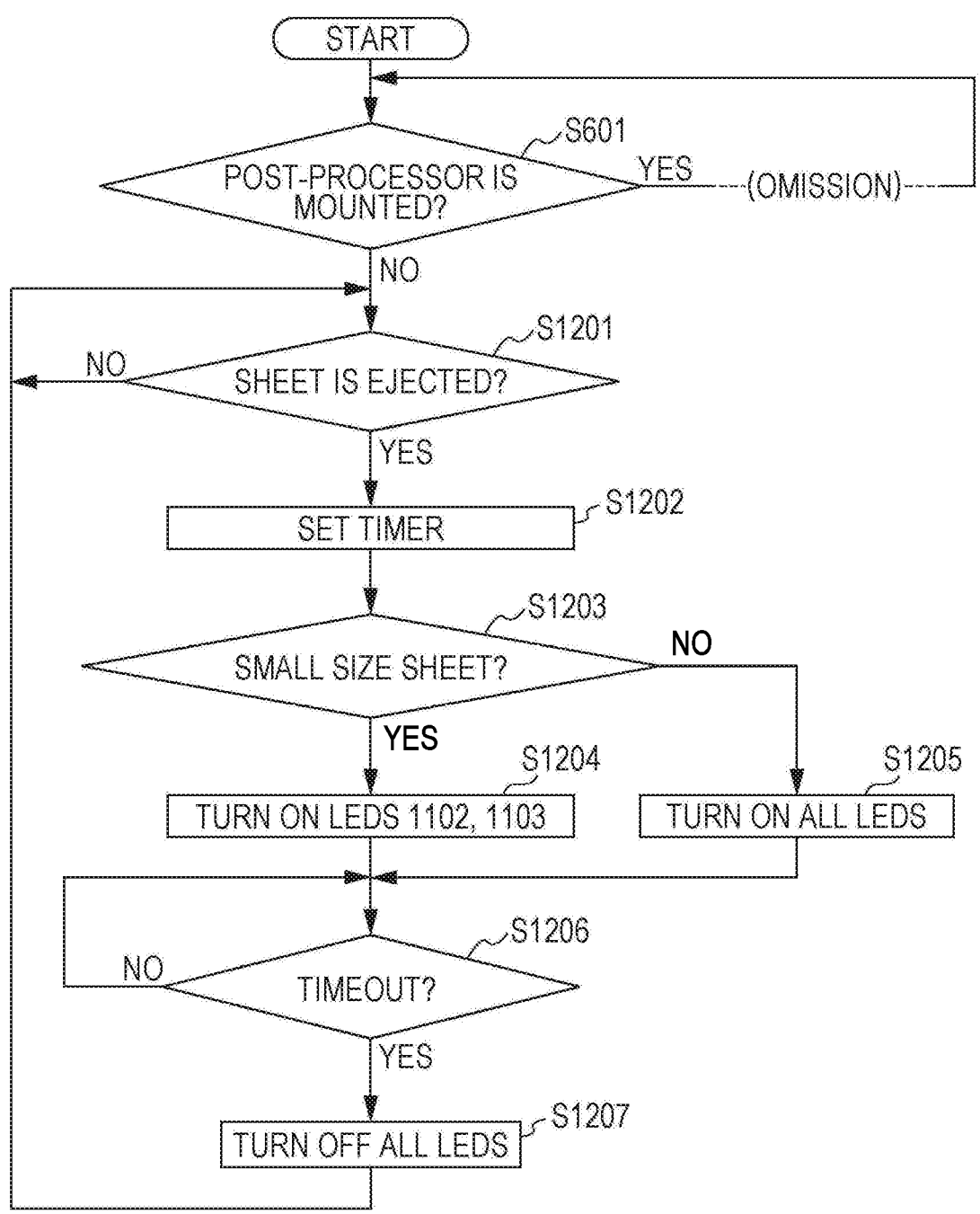
FIG. 12 is a flowchart for explaining control operation of the controller in the case where the post-processor is not mounted in the sheet ejection space and the LEDs above the sheet ejection port are also used for illumination of the sheet ejected.
Figure 13:
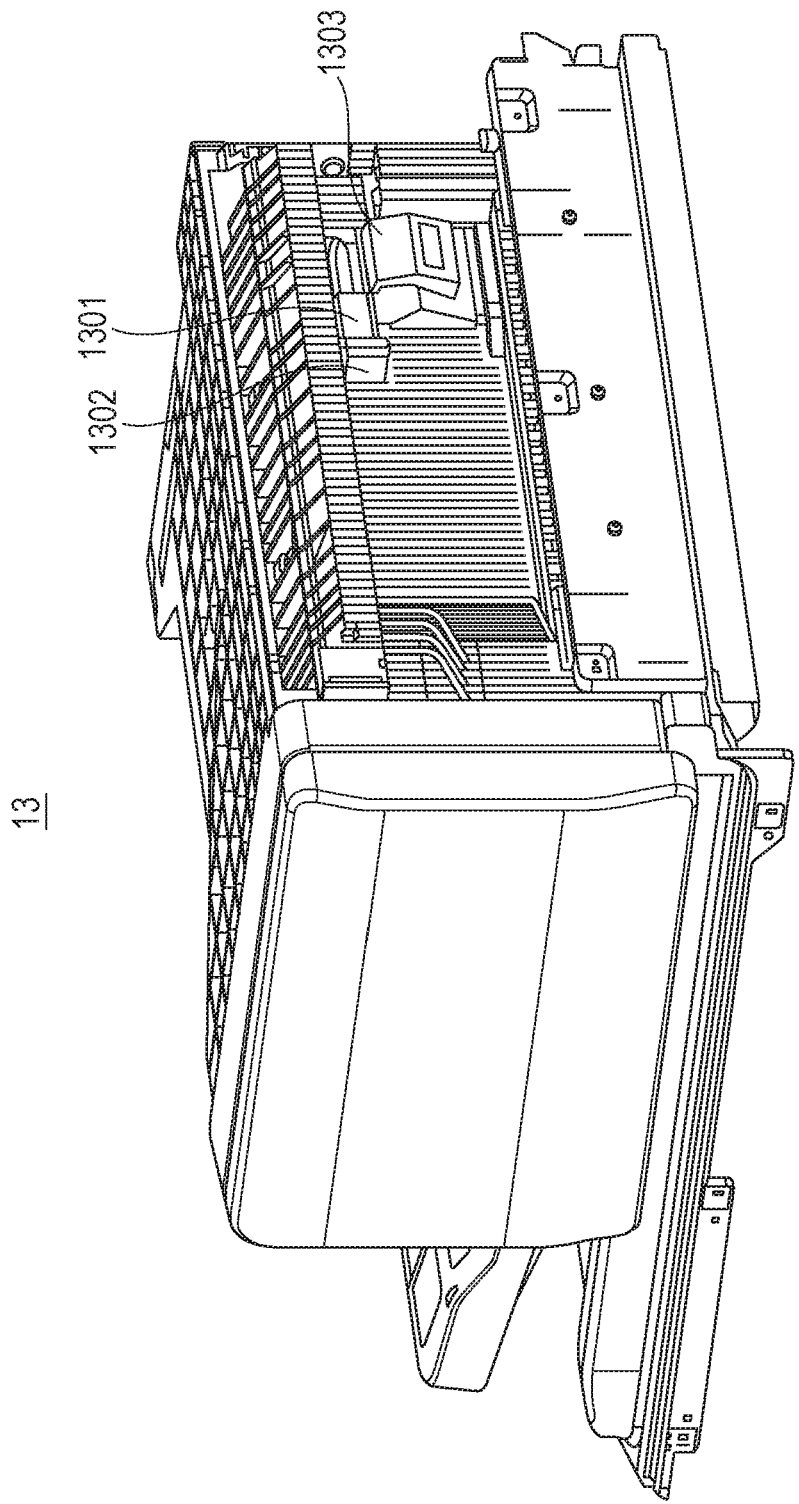
FIG. 13 is an external perspective view showing a configuration of a post-processor according to a conventional technique.

As shown in FIG. 12, the controller 134 according to the present modification confirms whether or not the post-processor 110 is mounted on the image forming apparatus 1, and if the post-processor 110 is mounted (S601: YES), processing as shown in FIG. 6 is executed. In this case, some or all of the LEDs 1101, 1102, 1103 and 1104 are also used for illuminating the maintenance position of the post-processor 110.

In a case where the post-processor 110 is not mounted (S601: NO), when timing to eject the sheet comes (S1201: YES), a predetermined time is set in the timer (S1202). In a case where the sheet to be ejected is a small size sheet (S1203: YES), the LEDs 1102 and 1103 are turned on (S1204), and if it is not a small size sheet (S1203: NO), the all the LEDs are turned on so that the entire large size sheet can be illuminated (S1205).

Thereafter, if timeout occurs (S1206: YES), all the LEDs are turned off (S1207), and the processing proceeds to step S1201, and the above processing is repeated. Note that, a combination of the area to be illuminated and the LED is not limited to the above, and can be appropriately changed.

Figure 11B:
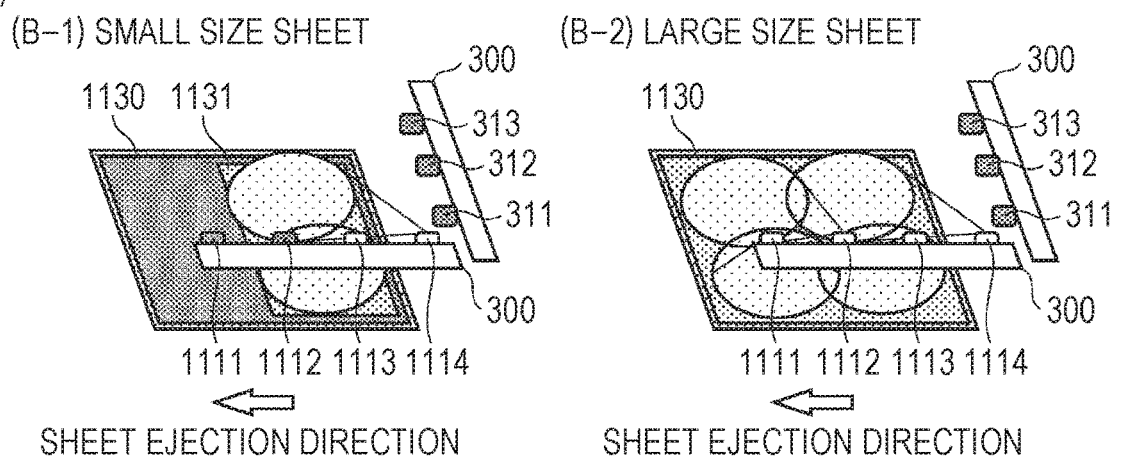
FIG. 11B shows a case where LEDs on front side upper part of an image forming apparatus are also used for illumination of the sheet ejected.

In addition, as shown in FIG. 11B, LEDs may be added to the front side of the illuminator 300 so as to be used also as illumination of the sheet ejected. In this case, the small size sheet can be illuminated by using the LEDs 1113 and 1114 near the sheet ejection port 135 of the image former 130 (FIG. 11B (B-1)), and the large size sheet can be illuminated by using all the LEDs in the same manner as described above (FIG. 11B (B-2)). The operation of the controller 134 is substantially the same as described above.

Figure 11C:
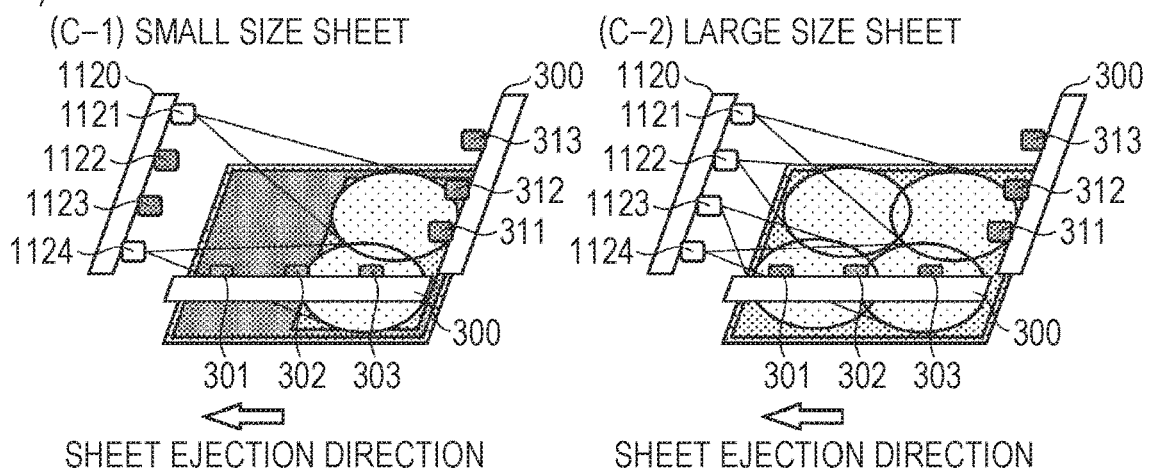
FIG. 11C shows a case where dedicated LEDs are provided for illuminating the sheet ejected, in a case where the post-processor is not mounted in the sheet ejection space.

Further, an illuminator 1120 may be provided separately from the illuminator 300 and used for illumination of the sheet ejected. FIG. 11C shows a case where the illuminator 1120 includes four LEDs 1121, 1122, 1123, and 1124, and when a small size sheet is illuminated, only the two LEDs 1121 and 1124 are turned on (FIG. 11C (C-1)), and when a large size sheet is illuminated, all the LEDs 1121, 1122, 1123 and 1124 are turned on (FIG. 11C (C-2)).

However, the number of LEDs included in the illuminator 1120 is not limited to four, and if two or more LEDs are provided and the combination of turning on/off is made different in accordance with the sheet size, the same effect as described above. In addition, needless to say, other lamps may be used instead of LEDs.

(5-8) In the above embodiment, as an example, the case has been described where the post-processor 110 is a so-called inner finisher that is enabled to move within the sheet ejection space and is arranged as a work target of the maintenance work within the sheet ejection space 100 of the image forming apparatus 1; however, needless to say, the present invention is not limited thereto, and the present invention can be applied also to a case where the post-processor 110 is a saddle finisher arranged beside the image forming apparatus 1.

For example, the saddle finisher needs to be provided with a conveying path in the sheet ejection space 100 for receiving a sheet ejected from the sheet ejection port 135 of the image forming apparatus 1, and there may be a case where a trouble such as a paper jam occurs in this conveying path and the maintenance work is necessary. In such a case, the conveying path corresponds to a movable work target, and if a paper jam portion is illuminated within the conveying path to be subjected to the maintenance work by the maintenance worker within the sheet ejection space, during the maintenance work, by using the illuminator 300, the maintenance work can be facilitated.

The image forming apparatus according to the present invention is useful as an apparatus that improves maintainability of a post-processor mounted within a sheet ejection space.

According to an embodiment of the present invention, since the image forming apparatus includes the illuminator, even when the work target such as the post-processor is downsized or the sheet ejection space is narrowed, the work target can be illuminated, and it becomes easy to emit the illumination light toward the work target.

In this case, in a case where it is detected that the work target is not in the work position for performing the human work, the controller desirably turns off the illuminator.

In addition, the controller may end illuminating after a lapse of a predetermined time from a start of illuminating the work target portion.

In addition, the illuminator may include a plurality of lamps, the plurality of lamps being subjected to on/off control independently of each other, the plurality of lamps illuminating mutually different work target portions of the work target, and the controller may perform on/off control of the illuminator to illuminate only a portion that becomes the work target portion.

In addition, the controller may cause the plurality of lamps to perform illumination at respective illuminances depending on the corresponding work target portions.

In addition, the plurality of lamps may perform illumination with respective light colors depending on the corresponding work target portions.

In addition, a detail acquisitor may be included that acquires a detail of the human work to be performed on the work target, and the controller may perform on/off control of the illuminator depending on the detail of the human work acquired by the detail acquisitor.

In addition, the work target may be a post-processor that performs post-processing on a sheet ejected, and the human work may be maintenance work of the post-processor.

In addition, a necessity determinator may be included that determines necessity of performing maintenance work on the post-processor, and in a case where a determination by the necessity determinator is affirmative, the controller may perform on/off control to cause the illuminator to blink while the post-processor moves from a stored position where the post-processing is performed to a pulled-out position where the post-processor is subjected to the maintenance work.

In addition, a mounting determinator may be included that determines whether or not a post-processor is mounted within the sheet ejection space, and in a case where a determination by the mounting determinator is negative, the controller may perform on/off control of the illuminator to illuminate a sheet ejected into the sheet ejection space.

In addition, in a case where the determination by the mounting determinator is affirmative, the controller may perform on/off control of the illuminator not to illuminate a sheet even when the sheet is ejected into the sheet ejection space.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus of an internal ejection type in which a sheet ejection space is provided between an image reader and an image former, the image forming apparatus comprising:
    an illuminator provided on a wall surface partitioning the sheet ejection space;
    a detector that detects a position of a work target enabled to move in pulling-out and storing directions within the sheet ejection space, the work target being movable relative to the illuminator in the sheet ejection space; and
    a controller that performs on/off control of the illuminator based on a detection by the detector,
    wherein in a case in which it is detected that the work target is in a work position for performing human work, the controller performs on/off control of the illuminator to illuminate a work target portion of the work target that faces an interior of the sheet ejection space and is to be subjected to the human work,
    wherein the work target is a post-processor that performs post-processing on an ejected sheet, and
    wherein the image forming apparatus further comprises:
        a mounting determinator that determines whether or not a post-processor is mounted within the sheet ejection space,
            wherein in a case in which a determination by the mounting determinator is negative, the controller performs on/off control of the illuminator to illuminate a sheet ejected into the sheet ejection space.

2. The image forming apparatus according to claim 1, wherein in a case in which it is detected that the work target is not in the work position for performing the human work, the controller turns off the illuminator.

3. The image forming apparatus according to claim 1, wherein the controller ends illuminating after a lapse of a predetermined time from a start of illuminating the work target portion.

4. The image forming apparatus according to claim 1, wherein:
    the illuminator includes a plurality of lamps, the plurality of lamps being subjected to on/off control independently of each other, and the plurality of lamps illuminating mutually different work target portions of the work target, and
    the controller performs on/off control of the illuminator to illuminate only a portion that becomes the work target portion.

5. The image forming apparatus according to claim 4, wherein the controller causes the plurality of lamps to perform illumination at respective illuminances depending on the work target portions.

6. The image forming apparatus according to claim 4, wherein the plurality of lamps perform illumination with respective light colors depending on the work target portions.

7. The image forming apparatus according to claim 1, further comprising:
    a detail acquisitor that acquires a detail of the human work to be performed on the work target,
    wherein the controller performs on/off control of the illuminator based on the detail of the work acquired by the detail acquisitor.

8. The image forming apparatus according to claim 1, wherein the human work is maintenance work of the post-processor.

9. The image forming apparatus according to claim 8, further comprising:
    a necessity determinator that determines necessity of performing maintenance work on the post-processor,
    wherein in a case in which a determination by the necessity determinator is affirmative, the controller performs on/off control to cause the illuminator to blink while the post-processor moves from a stored position where the post-processing is performed to a pulled-out position where the post-processor is to be subjected to the maintenance work.

10. An image forming apparatus of an internal ejection type in which a sheet ejection space is provided between an image reader and an image former, the image forming apparatus comprising:
    an illuminator provided on a wall surface partitioning the sheet ejection space;
    a detector that detects a position of a work target enabled to move in pulling-out and storing directions within the sheet ejection space; and
    a controller that performs on/off control of the illuminator based on a detection by the detector,
    wherein in a case in which it is detected that the work target is in a work position for performing human work, the controller performs on/off control of the illuminator to illuminate a work target portion of the work target that faces an interior of the sheet ejection space and is to be subjected to the human work,
    wherein the work target is a post-processor that performs post-processing on an ejected sheet, wherein the human work is maintenance work of the post-processor, and wherein the image forming apparatus further comprises:
a mounting determinator that determines whether or not a post-processor is mounted within the sheet ejection space,
wherein in a case in which a determination by the mounting determinator is negative, the controller performs on/off control of the illuminator to illuminate a sheet ejected into the sheet ejection space.

11. The image forming apparatus according to claim 10; wherein in a case in which the determination by the mounting determinator is affirmative, the controller performs on/off control of the illuminator not to illuminate a sheet even when the sheet is ejected into the sheet ejection space.

12. An image forming apparatus of an internal ejection type in which a sheet ejection space is provided between an image reader and an image former, the image forming apparatus comprising:
an illuminator provided on a wall surface partitioning the sheet ejection space;
a detector that detects a position of a work target enabled to move in pulling-out and storing directions within the sheet ejection space; and
a controller that performs on/off control of the illuminator based on a detection by the detector,
wherein:
in a case in which it is detected that the work target is in a work position for performing human work, the controller performs on/off control of the illuminator to illuminate a work target portion of the work target that faces an interior of the sheet ejection space and is to be subjected to the human work, and
in a case in which it is detected that the work target is not in the work position for performing the human work, the controller turns off the illuminator.

13. The image forming apparatus according to claim 12, wherein:
the illuminator includes a plurality of lamps, the plurality of lamps being subjected to on/off control independently of each other, and the plurality of lamps illuminating mutually different work target portions of the work target, and
the controller performs on/off control of the illuminator to illuminate only a portion that becomes the work target portion.

14. The image forming apparatus according to claim 12, further comprising:
a detail acquisitor that acquires a detail of the human work to be performed on the work target,
wherein the controller performs on/off control of the illuminator based on the detail of the work acquired by the detail acquisitor.

15. The image forming apparatus according to claim 12, wherein:

the work target is a post-processor that performs post-processing on an ejected sheet, and
the human work is maintenance work of the post-processor.

16. An image forming apparatus of an internal ejection type in which a sheet ejection space is provided between an image reader and an image former, the image forming apparatus comprising:
an illuminator provided on a wall surface partitioning the sheet ejection space;
a detector that detects a position of a work target enabled to move in pulling-out and storing directions within the sheet ejection space; and
a controller that performs on/off control of the illuminator based on a detection by the detector,
wherein:
in a case in which it is detected that the work target is in a work position for performing human work, the controller performs on/off control of the illuminator to illuminate a work target portion of the work target that faces an interior of the sheet ejection space and is to be subjected to the human work,
the controller comprises a timer, in which a predetermined time is set,
the controller ends illuminating after the timer counts a lapse of the predetermined time from a start of illuminating the work target portion, and
in a case in which it is detected that the work target is not in the work position for performing the human work, the controller turns off the illuminator.

17. The image forming apparatus according to claim 16, wherein:
the illuminator includes a plurality of lamps, the plurality of lamps being subjected to on/off control independently of each other, and the plurality of lamps illuminating mutually different work target portions of the work target, and
the controller performs on/off control of the illuminator to illuminate only a portion that becomes the work target portion.

18. The image forming apparatus according to claim 16, further comprising:
a detail acquisitor that acquires a detail of the human work to be performed on the work target,
wherein the controller performs on/off control of the illuminator based on the detail of the work acquired by the detail acquisitor.

19. The image forming apparatus according to claim 16, wherein:
the work target is a post-processor that performs post-processing on an ejected sheet, and
the human work is maintenance work of the post-processor.

* * * * *